United States Patent
Toutain

(10) Patent No.: US 12,278,829 B2
(45) Date of Patent: Apr. 15, 2025

(54) SYSTEMS AND METHODS FOR PREVENTING CYBERSECURITY ATTACKS THROUGH DIGITAL IDENTITY VERIFICATION

(71) Applicant: TurboCheck, Inc., Austin, TX (US)

(72) Inventor: Emmanuel Toutain, Austin, TX (US)

(73) Assignee: TurboCheck, Inc., Austin, TX (US)

( * ) Notice: Subject to any disclaimer, the term of this patent is extended or adjusted under 35 U.S.C. 154(b) by 0 days.

(21) Appl. No.: 18/811,739

(22) Filed: Aug. 21, 2024

(65) Prior Publication Data
US 2025/0071127 A1 Feb. 27, 2025

Related U.S. Application Data

(60) Provisional application No. 63/520,768, filed on Aug. 21, 2023.

(51) Int. Cl.
*H04L 9/40* (2022.01)

(52) U.S. Cl.
CPC .......... *H04L 63/1416* (2013.01); *H04L 63/08* (2013.01)

(58) Field of Classification Search
None
See application file for complete search history.

(56) References Cited

U.S. PATENT DOCUMENTS

| | | | | |
|---|---|---|---|---|
| 8,266,068 | B1 * | 9/2012 | Foss | G06Q 10/06 705/321 |
| 8,560,447 | B1 * | 10/2013 | Hinghole | G06Q 20/14 705/40 |
| 10,693,872 | B1 | 6/2020 | Larson et al. | |
| 11,093,900 | B1 | 8/2021 | Benjamin | |
| 2002/0120614 | A1 | 8/2002 | Kelly | |
| 2004/0186852 | A1 | 9/2004 | Rosen | |
| 2007/0162761 | A1 | 7/2007 | Davis et al. | |
| 2009/0086936 | A1 | 4/2009 | Clifford et al. | |
| 2009/0327006 | A1 | 12/2009 | Hansan et al. | |
| 2012/0150760 | A1 | 6/2012 | Barrett et al. | |
| 2016/0335533 | A1 | 11/2016 | Davis et al. | |
| 2017/0352098 | A1 | 12/2017 | Roberts et al. | |
| 2018/0365786 | A1 * | 12/2018 | Thompson | H04L 9/3236 |
| 2019/0108217 | A1 | 4/2019 | Chen | |

(Continued)

FOREIGN PATENT DOCUMENTS

WO 2016128567 A1 8/2016

OTHER PUBLICATIONS

Sarda et al., "Blockchain for Fraud Prevention: A Work-History Fraud Prevention System", 2018 17th IEEE International Conference on Trust, Security and Privacy in Computing and Communications/ 12th IEEE International Conference on Big Data Science and Engineering, Aug. 2018, pp. 1858-1863.

*Primary Examiner* — Joseph P Hirl
*Assistant Examiner* — Hassan Saadoun
(74) *Attorney, Agent, or Firm* — Brake Hughes Bellermann, LLP

(57) ABSTRACT

Systems and methods for verifying an applicant. An example method includes, receiving, from a user device, an application that includes an identifier associated with an applicant; determining a digital profile for the applicant based on the identifier, processing the digital profile through an assessment model to determine a metric for the applicant; and providing, to the user device, validation data for the application based on the metric for the applicant.

20 Claims, 5 Drawing Sheets

(56) References Cited

U.S. PATENT DOCUMENTS

| | | |
|---|---|---|
| 2019/0164108 A1 | 5/2019 | Chimka et al. |
| 2019/0205885 A1* | 7/2019 | Lim .................... H04L 63/1483 |
| 2019/0251234 A1 | 8/2019 | Liu et al. |
| 2020/0082346 A1* | 3/2020 | Tandra ............... G06Q 10/1053 |
| 2020/0090129 A1 | 3/2020 | Calix Leigh-Reign |
| 2021/0312400 A1* | 10/2021 | Irimie ................. H04L 63/1416 |
| 2022/0012672 A1 | 1/2022 | Inman et al. |
| 2022/0156397 A1* | 5/2022 | Song ...................... H04L 51/04 |

* cited by examiner

300

ID DIGITAL VERIFICATION

Input:
Jane Doe
jd.7243@gmail.com
(713) 225-9242

SCORE: 0 / 100

| | | |
|---|---|---|
| 1. | Full score before any deductions. | +100 |
| 2. | More than ten (10) online accounts are associated with this email. | +80 |
| 3. | Joined LinkedIn more than 15 years ago. | +70 |
| 4. | Email has been used for more than ten (10) years. | +30 |
| 5. | Completely different name associated with this email. Please Check! | -300 |
| 6. | Phone number is associated with a disposable VoIP phone. | -30 |
| 7. | Some of the profile pictures do not match. Please Check! | -300 |
| 8. | Mismatch between US/Canada phone number and Russia IP geolocation. Please Check! | -300 |

EMAIL & ASSOCIATED ACCOUNTS

Email: jd.7243@gmail.com     First public record: 2008-07-01

LinkedIn   VIEW PROFILE >
Anastasia Ivanov ← ---- Different person
Equifax
Java Developer
Moscow, Russia

Skype
Jane Doe
jane.doe
Austin, Texas
United States

Google | Facebook | X (Twitter) | Instagram
Microsoft | GitHub | Quora | Apple
Disney+ | Booking | Patreon | Spotify
Vimeo | Yahoo | Flickr | Myspace

PHONE & ASSOCIATED ACCOUNTS
Phone: (713) 225-9242
CNAM: Jane Doe

Carrier: Vonage (VoIP) ← ---- Disposable phone to mask true identity

Skype
Jane Doe
jane.doe
Austin, Texas
United States

Facebook | X (Twitter)
Instagram | Microsoft
WhatsApp

ID DIGITAL VERIFICATION

Input:
Jane Doe
jd.7243@gmail.com
(713) 225-9242

Con't

WORK EXPERIENCE

7 yrs 4 mos of experience / 5 jobs in the USA      10 yrs 8 mos of experience / 7 jobs in total

| Date | Company | Role | Location | Duration |
|---|---|---|---|---|
| Jun 2023 | Created LinkedIn profile | | | |
| Jun 2022 - Present | Equifax | Sr. Full Stack Java Developer | USA | 1 yr 8 mos |
| Jan 2021 - May 2022 | Capital One | Sr. Java/J2EE Developer / Full Stack Developer | USA | 1 yr 4 mos |
| Jul 2019 - Dec 2020 | Intermountain Health | Sr. Java/J2EE Developer / Full Stack Developer | USA | 1 yr 5 mos |
| Feb 2018 - Jun 2019 | Trinity Health | Sr. Java/J2EE Developer / Full Stack Developer | USA | 1 yr 4 mos |
| Oct 2016 - Jan 2018 | Citair Travel | Java/J2EE developer | USA | 1 yr 3 mos |
| Nov 2014 - May 2016 | ShopClues | Java/J2EE developer | India | 1 yr 6 mos |
| Jun 2013 - Oct 2014 | ICICI Bank | Software Developer | India | 1 yr 4 mos |

IP GEOLOCATION

IP Address: 103.205.129.98

| | | | |
|---|---|---|---|
| City: | Moscow | Web Proxy: | No |
| Province: | Moscow Oblast ← Inconsistent IP geolocation | Public Proxy: | No |
| Country: | Russia | DC Proxy: | No |
| IP Type: | ISP | TOR: | No |
| ISP: | Way 2 Internet Private Limited | VPN: | No |

PROFILE PICTURES

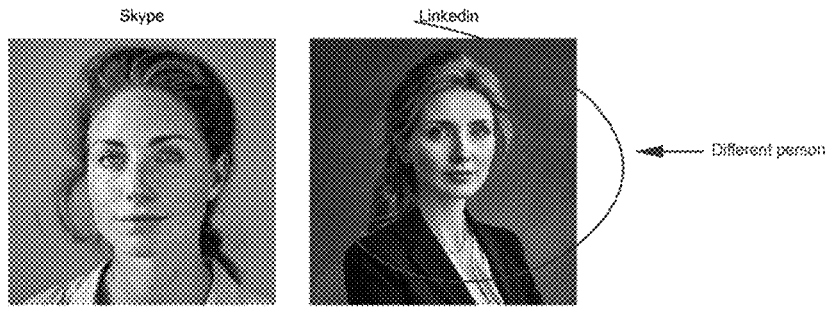

Skype      LinkedIn      ← Different person

FIG. 3B

SYSTEMS AND METHODS FOR PREVENTING CYBERSECURITY ATTACKS THROUGH DIGITAL IDENTITY VERIFICATION

RELATED APPLICATION

This application is a non-provisional of, and claims priority to, U.S. Provisional Application No. 63/520,768, filed Aug. 21, 2023, the disclosure of which is incorporated by reference in its entirety.

BACKGROUND

The rise of cloud computing, artificial intelligence, and social media platforms has revolutionized business operations but has also led to a significant increase in cybersecurity attacks. As organizations increasingly depend on digital platforms, they face heightened risks from unauthorized access and data breaches. Particularly concerning is the role of malicious insiders—specifically employees and contractors—who account for approximately one third of all data breaches by exploiting their legitimate access to sensitive information, often with devastating consequences. The ability to quickly detect and eliminate these internal security threats during the selection and hiring stages is paramount.

SUMMARY

Organizations have seen an alarming rise in insider threats—individuals who, once hired, exploit their access to sensitive information for malicious purposes. The shift to remote and hybrid work, along with the increasing prevalence of virtual interviews, has further expanded the opportunities for these malicious insiders to infiltrate organizations. Malicious individuals have increasingly found ways to bypass traditional background checks. To address these challenges, the systems and methods described herein provide a digital identity verification process that may be employed to prevent cybersecurity attacks during, for example, the hiring and selection stages. By verifying the digital identities of applicants, potential insider threats are identified before granting access to internal systems, significantly reducing the risk of data breaches.

Implementations of the present disclosure include systems and methods for verifying the digital identity of applicants to assess potential cybersecurity risks. In an example implementation, a unique identifier for an applicant is provided, which is distinct from authentication procedures initiated by applicants to access systems. Using this identifier, the system may generate a digital profile for the applicant. The system operates within a secure, fully encrypted environment, ensuring that data remains protected both in storage and during transmission. To evaluate the applicant's digital presence, a check as to whether the provided identifier is linked to accounts across various websites is performed. In some cases, this process is conducted without triggering email notifications from those sites, preserving the confidentiality and integrity of the verification process. The digital profile may then be analyzed through a specialized model designed to assess potential cybersecurity risks posed by the applicant. The resulting risk assessment may subsequently be delivered to the user device for further action (e.g., as validation data).

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

The following detailed description that sets forth aspects of the subject matter, along with the accompanying drawings of which:

FIGS. 3A and 3B depict a non-limiting example of a page from a report providing validation data for an application based on a verification of an applicant.

DETAILED DESCRIPTION

Figure 1:
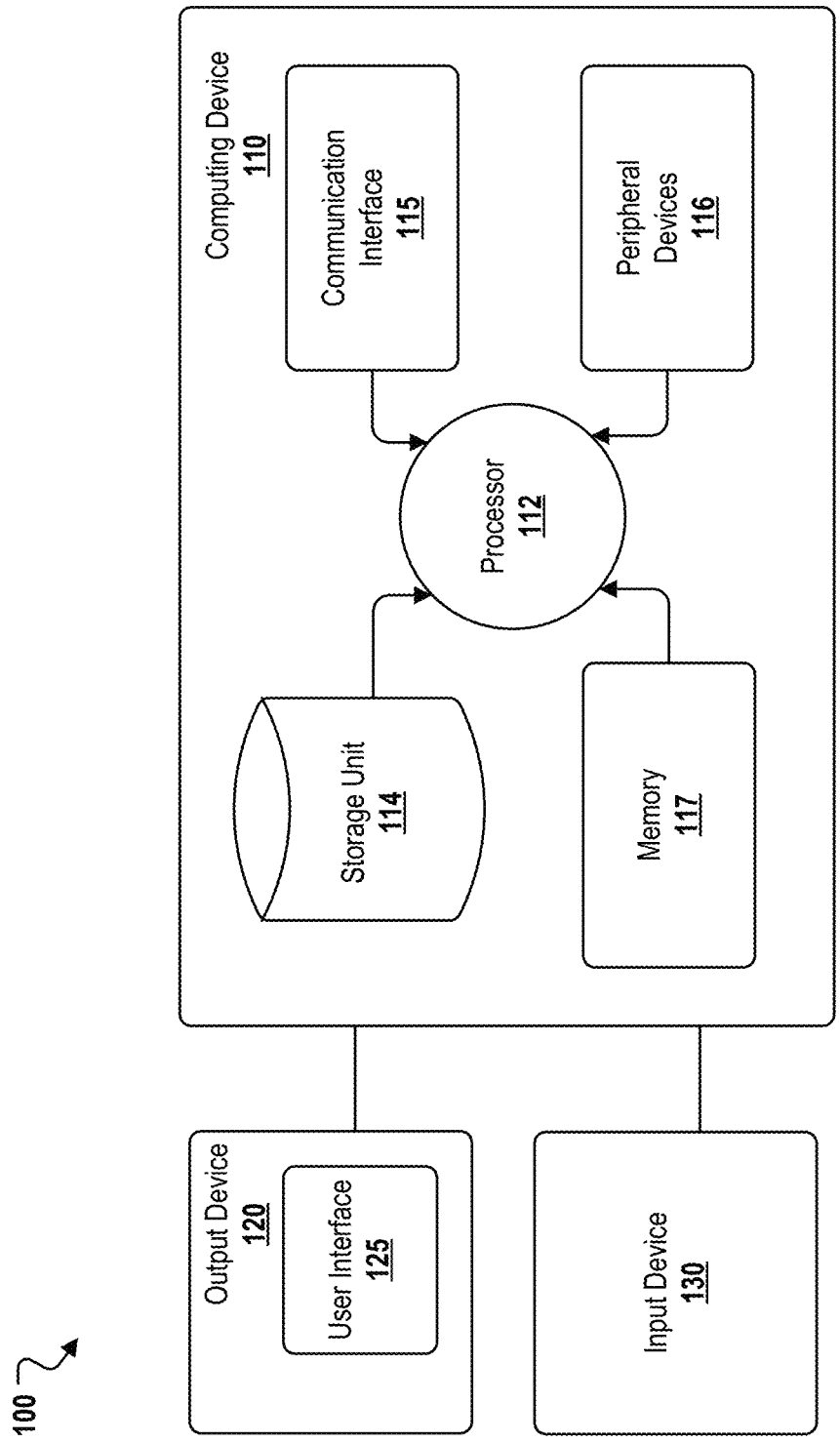
FIG. 1 depicts an example system that includes a computer or computing device that can be programmed or otherwise configured to implement the systems and methods described herein.

Systems, methods, apparatus, and computer program products are provided for securely and timely verifying the digital identities of applicants who may attempt to infiltrate organizations with malicious intent. Some of these individuals go to great lengths to create fictional personas, including the use of counterfeit documents, to obscure their true identities. However, they often fail the digital ID verification process of the disclosure technique. The techniques disclosed herein are designed to objectively and timely validate that these applicants have a legitimate digital presence by using a unique identifier, such as an email address or phone number. These techniques leverage a combination of secure data inputs, HTTPS requests, models, and other relevant information sources to generate meaningful outputs for users and can do so in real-time, enabling disclosed techniques to be used at scale. These outputs are employed to verify the authenticity of applicants, enabling involved parties—such as business managers, security officers, and recruiters—to avoid hiring malicious individuals who could pose a security threat.

Implementation of the described applicant verification system employs advanced machine learning techniques and innovative analysis of digital fingerprints to offer a concrete solution for mitigating cybersecurity risks during, for example, the hiring process. Unlike traditional methods that rely on static databases or simple matching algorithms, the described system provides a dynamic and context-aware approach, incorporating real-time data analysis and adaptive learning mechanisms to provide accurate and actionable insights. This technical innovation not only improves the accuracy of identifying potential threats but also enhances the overall efficiency and reliability of the digital identity verification process.

In some implementations, the applicant verification system described herein performs a thorough and secure analysis of an applicant's digital presence using unique identifiers, such as an email address or phone number, to generate a comprehensive digital profile. In some cases, this process includes aggregating data from online accounts and other digital sources associated with the applicant. For instance, the system performs email or phone lookups using secure HTTPS requests to query hundreds of sites simultaneously (e.g., in parallel), verifying whether the unique identifier is registered across the various digital and social platforms without triggering email notifications to the data subject, as would occur with a manual, non-digital approach. Such unsolicited emails in a manual approach would not only compromise the integrity of the verification process but also be profoundly annoying for the data subject, potentially leading to a negative experience and damaging the relationship with the employer—an issue that is entirely avoided with the automated system. In some cases, the system also determines whether the data subject has been involved in a data breach and whether the identifier is associated with a Voice over Internet Protocol (VoIP) service. In some implementations, a digital profile for the applicant is generated using the collected data through a cybersecurity assessment model. The digital profile may then be employed to confirm the authenticity and digital existence of the individual.

Before disclosing the subject matter in greater detail, some context including terminology used herein is introduced.

Definitions

As used herein, the term "employer" (or "cybersecurity agent," "recruiter," or "business manager") refers to the individual or entity responsible for initiating and controlling the digital identity verification process for an applicant.

As used herein, the term "applicant" refers to any individual, independent contractor, or person employed by an independent contractor who seeks to secure a position within an organization. In this context, the applicant is the data subject whose digital identity is being verified by the employer or hiring entity.

As used herein, the term "unique identifier" refers to a numeric or alphanumeric string uniquely associated with an applicant, such as an email address or phone number. In some implementations, the described system does not utilize government-issued identification as a unique identifier, thus focusing on identifiers that are commonly used in digital communications. However, other embodiments may incorporate a variety of unique identifiers depending on the specific security requirements of the organization. In some cases, the unique identifier is provided by the employer, ensuring that the verification process remains under the employer's control and is not part of an authentication process initiated by the data subject.

As used herein, the term "digital profile" refers to a comprehensive collection of information (e.g., attributes) associated with an applicant's unique identifier, gathered from a vast range of online sources. In some implementations, a digital profile is generated for an applicant by providing a number (e.g., dozens, hundreds, or thousands) of queries to online websites simultaneously (e.g., in parallel and within seconds). In some cases, data is aggregated directly from these sources to form an up-to-date and detailed profile of the individual. In some implementations, this process includes extensive email lookups, phone lookups, domain searches, reverse image searches, search results from email breach databases, and other publicly available sources, without relying on static databases. The broad scope and rapid speed of data collection render manual verification both impractical and virtually impossible. Digital profile attributes include the number of online accounts associated with the unique identifier. In some implementations, digital profile attributes include information related to online account registrations and profiles (e.g., social media accounts, online streaming accounts, online shopping accounts, work-related online applications, professional networking profiles, and the like) linked to the unique identifier as well as information regarding the online platforms or services associated with these accounts. In some implementations, the information related to the online account registrations and profiles includes the date when each account or profile was created. In some implementations, other example digital profile attributes include the applicant's name, a Caller Name Display (CNAM), biographical information, headlines, location details, past employment information, profile pictures, the number of connections or followers on social media or networking platforms, association with a Voice over Internet Protocol (VoIP) services, and similar data.

As used herein, the term "cybersecurity risk assessment model" or "assessment model" refers to an algorithm that determines the potential security risks posed by an applicant by processing the applicant's digital profile. In some embodiments, the model assigns weighted values to various attributes within the digital profile, prioritizing factors that indicate a higher security risk. For instance, attributes that may be heavily weighted include the number of online account, the creation date of the accounts, the number of connections on a social media site (e.g., LinkedIn, Facebook, Instagram, X, TikTok, Snapchat, Reddit, Pinterest, etc.) and whether the unique identifier is associated with a VoIP Phone Number. In some embodiments, the model is a trained artificial intelligence (AI) model developed using digital profiles generated for a plurality of applicants. In some embodiments, the AI model is trained using supervised learning techniques and may be continuously retrained with each new digital profile and associated risk assessment. In some embodiments, the model is a trained neural network to accurately identify and assess cybersecurity risks.

As used herein, the term "CyberThreat Metric" (also referred to herein as "metric") refers to an assessment of the likelihood that an applicant poses a cybersecurity threat, as determined by the cybersecurity risk assessment model. The CyberThreat Metric, along with the detailed information from the applicant's digital profile, may be provided in a report or through a user interface that is accessible by an inquiring party (e.g., business manager, security officer, recruiter, and the like.) to help determine the potential security risk associated with the applicant. Additionally, the CyberThreat Metric may be provided through various electronic integration methods, including but not limited to, Representational State Transfer (REST) API or other forms of software-to-software communication. In one embodiment, the CyberThreat Metric is used to assign a cybersecurity risk level to each applicant (e.g., "High", "Medium", "Low"), enabling the inquiring party to make informed decisions about the applicant's suitability for the organization.

Example System

FIG. 1 depicts an example of a system 100 that includes a computer or computing device 110 that can be programmed or otherwise configured to implement systems or methods of the present disclosure. For example, the computing device 110 can be programmed or otherwise configured to implement an applicant verification system as well as the process 400 described below with reference to FIG. 4.

The computer or computing device 110 includes an electronic processor (also "central processing unit" (CPU), "processor," and "computer processor" herein) 112, which is optionally a single core, a multi core processor, or a plurality of processors for parallel processing. The depicted embodiment also includes memory 117 (e.g., random-access memory, read-only memory, flash memory), electronic storage unit 114 (e.g., hard disk or flash), communication interface 115 (e.g., a network adapter or modem) for communicating with one or more other systems, and peripheral devices 116, such as cache, other memory, data storage, microphones, speakers, and the like. In some implementations, the memory 117, electronic storage unit 114, communication interface 115 and peripheral devices 116 are in communication with the electronic processor 112 through a communication bus (shown as solid lines), such as a motherboard. In some implementations, the bus of the computing device 110 includes multiple buses. In some implementations, the computing device 110 includes more or fewer components than those illustrated in FIG. 1 and performs functions other than those described herein.

In some implementations, the memory 117 and electronic storage unit 114 include one or more physical apparatuses used to store data or programs on a temporary or permanent basis. In some implementations, the memory 117 is volatile memory and requires power to maintain stored information. In some implementations, the electronic storage unit 114 is non-volatile memory and retains stored information when the computer is not powered. In further embodiments, memory 117 or electronic storage unit 114 is a combination of devices such as those disclosed herein. In some implementations, memory 117 or electronic storage unit 114 is distributed across multiple machines such as a network-based memory or memory in multiple machines performing the operations of the computing device 110.

In some cases, the electronic storage unit 114 is a data storage unit or data store for storing data. In some instances, the electronic storage unit 114 stores files, such as drivers, libraries, and saved programs. In some implementations, the electronic storage unit 114 stores user data (e.g., user preferences and user programs). In some implementations, the computing device 110 includes one or more additional data storage units that are external, such as being located on a remote server that is in communication through an intranet or the internet.

In some implementations, methods as described herein (e.g., process 400 described in FIG. 4) are implemented by way of machine or computer executable code stored on an electronic storage location of the computing device 110, such as, for example, on the memory 117 or the electronic storage unit 114. In some implementations, the electronic processor 112 is configured to execute the code. In some implementations, the machine executable or machine-readable code is provided in the form of software. In some cases, the code is retrieved from the electronic storage unit 114 and stored on the memory 117 for ready access by the electronic processor 112.

The electronic processor 112 is configured to perform various operations, such as fetching, decoding, executing, and writing back, and the like. In some cases, the electronic processor 112 is a component of a circuit, such as an integrated circuit. One or more other components of the computing device 110 can be optionally included in the circuit. In some cases, the circuit is an application specific integrated circuit (ASIC) or a field programmable gate array (FPGA). In some cases, the operations of the electronic processor 112 can be distributed across multiple machines (where individual machines can have one or more processors) that can be coupled directly or across a network.

In some implementations, the computing device 110 is optionally operatively coupled to a communication network, such as a communication network 210 described with reference to FIG. 2, via the communication interface 115. In some implementations, the computing device 110 communicates with one or more remote computer systems through the communication network. In some implementations, a user can access the computing device 110 via the communication network. In some implementations, the computing device 110 is configured as a node within a peer-to-peer network.

With continued reference to FIG. 1, In some implementations, the computing device 110 includes or is in communication with one or more output devices 120. In some implementations, the output device 120 includes a display to send visual information to a user. In some implementations, the output device 120 is a touch sensitive display that combines a display with a touch sensitive element that is operable to sense touch inputs as and functions as both the output device 120 and the input device 130. In still further embodiments, the output device 120 is a combination of devices such as those disclosed herein. In some implementations, the output device 120 displays a user interface 125 generated by the computing device (e.g., software executed by the computing device 110).

In some implementations, the computing device 110 includes or is in communication with one or more input device 130. The input device is configured to receive information from a user. In some implementations, the input device 130 is a keyboard. In some implementations, the input device 130 is a keypad (e.g., a telephone-based keypad). In some implementations, the input device 130 is a cursor-control device including, by way of non-limiting examples, a mouse, trackball, trackpad, joystick, game controller, or stylus. In some implementations, as described above, the input device 130 is a touchscreen or a multi-touchscreen. In other embodiments, the input device 130 is a microphone to capture voice or other sound input. In other embodiments, the input device 130 is a camera or video camera. In still further embodiments, the input device is a combination of devices such as those disclosed herein.

In some implementations, the computing device 110 includes an operating system configured to perform executable instructions. The operating system is, for example, software, including programs and data that manages the hardware of the device and provides services for execution of applications.

Example Environment

Figure 2:
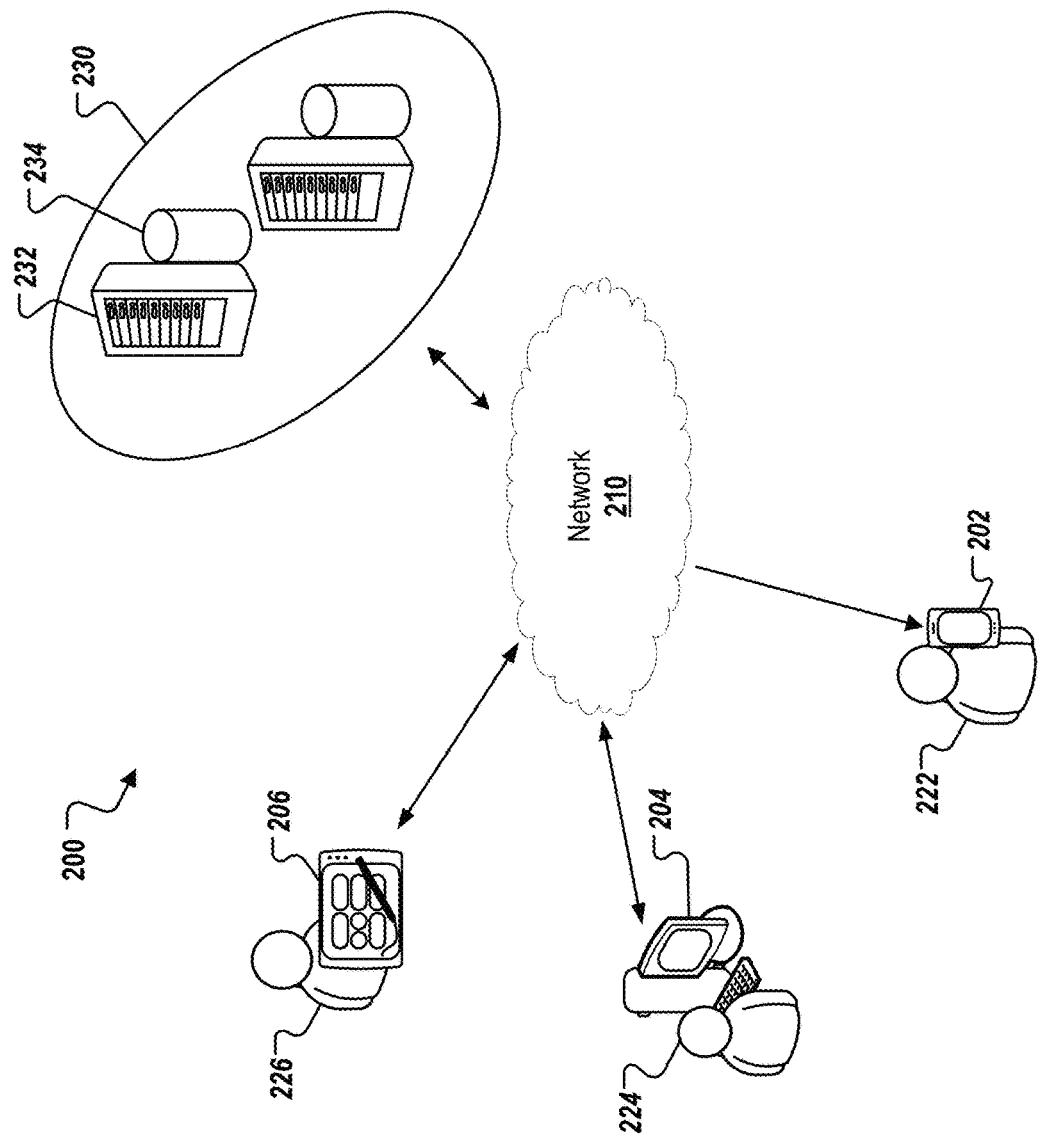
FIG. 2 depicts an example environment that can be employed to execute the systems and methods described herein.

With reference to FIG. 2, the computing device 110 may be embodied in an electronic device, such as the electronic devices 202, 204, and 206, which can include, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. As depicted in FIG. 2, within the depicted example environment 200, the electronic devices 202, 204, 206 can communicate to a back-end system 230 via a communication network 210.

Three electronic devices 202, 204, and 206 are depicted in the example environment 200 of FIG. 2 for simplicity. As illustrated, the electronic device 202 is depicted as a smartphone, the electronic device 204 is depicted as a tablet-computing device, and the electronic device 206 is depicted as a desktop computing device. It is contemplated, however, that embodiments of the present disclosure can be realized with any suitable computing devices, such as those mentioned previously and the like. Moreover, embodiments of the present disclosure can employ any number of devices.

In some examples, users 222, 224, and 226 of the electronic devices 202, 204, and 206 interact with the system through a graphical user interface (GUI) (e.g., the user interface 125) or an application that is installed and executed on their respective electronic devices 202, 204, and 206. In some examples, the electronic devices 202, 204, and 206 provide viewing data to screens with which the users 222, 224, and 226, can interact.

The communication network 210 may include wireless and wired portions. In some implementations, the communication network 210 is implemented using one or more existing networks, for example, a cellular network, the Internet, a land mobile radio (LMR) network, a BLUETOOTH network, a wireless local area network (e.g., Wi-Fi), a wireless accessory Personal Area Network (PAN), a Machine-to-machine (M2M) network, and a public switched telephone network. The communication network 210 may also include future developed networks. In some implementations, the communication network 210 includes the Internet, an intranet, an extranet, or an intranet and/or extranet that is in communication with the Internet. In some implementations, the communication network 210 includes a telecommunication or a data network.

In some implementations, the communication network 210 connects web sites, devices (e.g., the electronic devices 202, 204, and 206) and back-end systems (e.g., the back-end system 230). In some implementations, the communication network 210 can be accessed over a wired or a wireless communications link. For example, mobile computing devices (e.g., the smartphone device 202 and the tablet device 206), can use a cellular network to access the communication network 210.

In some implementations, the back-end system 230 includes at least one server 232 and at least one data store 234. In some implementations, the server 232 is sustainably similar to device 110 depicted in FIG. 1. In some implementations, the server 232 is a server-class hardware type device. In some implementations, the back-end system 230 includes computer systems using clustered computers and components to function as a single pool of seamless resources when accessed through the communication network 210. For example, such embodiments may be used in data center, cloud computing, storage area network (SAN), and network attached storage (NAS) applications. In some implementations, the back-end system 230 is deployed using a virtual machine(s).

In some implementations, the data store 234 is a repository for persistently storing and managing collections of data. Example data stores that may be employed within the described system include data repositories, such as a database as well as simpler store types, such as files, emails, and so forth. In some implementations, the data store 234 includes a database. In some implementations, a database is a series of bytes or an organized collection of data that is managed by a database management system (DBMS).

In some implementations, the back-end system 230 hosts one or more computer-implemented services provided by the described system with which users 222, 224, and 226 can interact using the respective electronic devices 202, 204, and 206. For example, in some implementations, the back-end system 230 is configured to receive a unique identifier for an applicant (e.g., from an employer) and gather information from online resources based on the unique identifier and generate a digital profile for the applicant. In some embodiment, the application information is gathered (e.g., simultaneously or in parallel) from Adobe®, Airbnb®, Amazon®, Apple®, Atlassian®, Booking®, Disney+®, Facebook®, Google®, Instagram®, LinkedIn, Microsoft®, Netflix®, Samsung®, Skype®, Twitter® (X), Zoho®, and hundreds of other publicly commonly used online sites. In some implementations, the back-end system 230 processes the digital profile through a cybersecurity risk assessment detection model to determine the cybersecurity threat that the applicant might pose. In some implementations, the back-end system 230 provides the CyberThreat Metric along with a report based on the CyberThreat Metric and digital profile to the electronic devices 202, 204, and 206. In some implementations, the back-end system 230 aggregates digital profiles and trains the cybersecurity risk assessment model with the aggregated data. Additionally, in some implementations, the back-end system 230 provides services for various electronic integration methods, such as REST API or other forms of software-to-software communication, to receive the unique identifier and provides the CyberThreat Metric and digital profile.

Online Registrations Verification

In some implementations, the digital profile generated by the back-end system 230 provides verification of whether or not an applicant genuinely exists within the digital ecosystem. In today's interconnected world, it is nearly impossible for an individual to avoid using technology. Individuals typically engage with dozens, if not hundreds, of applications daily, ranging from social media platforms to e-commerce sites. Each time a person registers for a new service, they are required to provide a unique identifier, such as an email address or phone number. Over time, legitimate individuals accumulate associations between their email and phone numbers and a wide array of online services, resulting in a comprehensive digital footprint.

Malicious actors, in contrast, often attempt to conceal their true identities by creating fake or proxy profiles. These individuals typically generate new email addresses using services like Gmail or Yahoo, which they then use exclusively to create accounts on platforms like LinkedIn or various job boards for the purpose of applying to jobs. However, these disposable emails are rarely, if ever, used on other online websites, resulting in a limited and narrowly focused digital presence. Unlike legitimate users, whose email addresses are associated with a wide range of online activities, these proxy profiles often appear on only a handful of platforms, making them easy to identify with the present solution.

To differentiate between legitimate users and potential cybersecurity criminals, the back-end system 230 may provide services that leverage the signup and password recovery mechanisms of online platforms. In some cases, the system sends automated queries to a wide range of websites, attempting to either sign up for a new account or initiate a password reset using the provided email or phone number. If the identifier is already registered on the platform, the signup page may return a response such as "profile already exists," indicating the presence of an account. Conversely, if the identifier is not registered, the password recovery page may return a message such as "profile not found." This process allows the system to verify whether the email or phone number is genuinely registered on the platform.

One significant drawback of performing the above process manually is that many websites would typically send an email to the user when a password reset is requested or when a new account is created. This could lead to a barrage of unwanted emails, which would be not only highly annoying to legitimate individuals but also detrimental to the integrity and confidentiality of the verification process. To overcome this, in some implementations, the described system uses a single GET HTTP request to interact with these websites. In such implementations, the response received from the site displays an error message, and the system holds back from triggering any emails. This method ensures that the applicant is not inundated with potentially hundreds of emails while allowing the system to gather the necessary information discreetly. By preventing these emails from being sent, the system preserves the confidentiality of the verification process and avoids alerting the applicant or any third parties to the ongoing check. This technique is particularly valuable because it enables the system to perform checks across hundreds of websites without compromising the integrity of the process or causing inconvenience to the individuals being verified.

In some implementations, the services provided via the back-end system 230 checks registrations across hundreds of commonly used sites, categorized into various sectors, including, but not limited to: Social Media (e.g., Facebook, Twitter, Instagram), Online Shopping (e.g., Amazon, Walmart, Best Buy), Travel and Transportation (e.g., Airbnb, Booking.com, Uber, Amtrak, American Airlines), Streaming Services (e.g., Netflix, Disney+, Spotify), Work and Productivity (e.g., Adobe, Atlassian, GitHub), Lifestyle and Fitness (e.g., Strava, MyFitnessPal, Fitbit, Gaming (e.g., Chess.com, Pogo, World of Warcraft), Finance (e.g., Venmo, PayPal, Coinbase) and the like. Legitimate individuals are likely to be registered on dozens of these platforms, reflecting their extensive online activity. In contrast, malicious actors using disposable emails and phone numbers associated with fake proxy profiles are unlikely to be registered on more than a handful of these sites, such as Gmail, LinkedIn, and perhaps a few others. By analyzing the breadth and depth of the applicant's online registrations, the described system can effectively distinguish between real individuals and those attempting to mask their identity, contributing to a more accurate and reliable CyberThreat Metric.

Consent Module for Enhanced Cybersecurity Risk Assessment

In addition to the functionalities described herein, the back-end system 230 may validate the authenticity of applicants based on information collected from the electronic devices 202, 204, and 206 via a Consent Module for Enhanced Cybersecurity Risk. This module is designed to ensure that all data interactions comply with stringent cybersecurity protocols while enhancing the security of the applicant verification process. In some implementations, the module is configured to send communications (e.g., emails, text messages, and the like) to applicants soliciting their consent for data collection. While providing consent, as the applicant engages with the module from either a phone or laptop, the system may automatically detect the applicant's electronic device and network usage characteristics. This data may then be securely transmitted back to the system when the applicant submits their consent. In some implementations, all data is encrypted both in transit and in storage, ensuring the highest levels of security throughout the process.

In some implementations, the digital fingerprint encompasses a wide array of data points, designed to provide a detailed profile of the applicant's digital and network behavior. These data points may include, but are not limited to, internet protocol (IP) Geolocation to ascertain the physical location of the device; analysis of network characteristics to detect the use of web proxies, public proxies, The Onion Router (TOR) networks, virtual private network (VPN) services, datacenter proxies, and similar tools that may obscure true identity or location. In some implementations, the digital fingerprint also includes an assessment of the SPAM blacklisting status of the device and identification of the internet service provider (ISP) name, type, and location. Additionally, in some cases, the module generates unique hashes for cookies, the device, and the browser used by the applicant, creating a robust profile of each user's digital presence.

In some implementations, the Consent Module for Enhanced Cybersecurity Risk Assessment is further equipped to identify patterns indicative of cybersecurity risks based on the collected digital fingerprints. For example, the module may detect inconsistencies when IP Geolocation data does not align with the country code of the associated phone number, or when other unusual activities are identified. As another example, the module is also capable of comparing the newly collected digital fingerprints with previously stored data within the system (e.g., in data store 234), allowing it to detect whether a device has previously been previously used for submitting applications under a false identity. By integrating this advanced security, the system enhances the security and reliability of the applicant verification process.

In some implementations, this digital fingerprint analysis component employs a multi-layered approach, analyzing not only the surface-level data (such as IP addresses and device information) but also deeper network behaviors, including packet-level data transmission patterns and historical usage trends. This multi-faceted analysis ensures that the system can detect even the most subtle anomalies, providing a robust defense against cybersecurity threats.

Example Screen

FIGS. 3A and 3B depict an example page 300 that can be provided to a user via the user interface 125. As depicted, the example page 300 shows areas where discrepancies in an applicant's digital profile can be highlighted. As shown in FIGS. 3A and 3B, these discrepancies can include discrepancies among various platform profiles, carrier (e.g., VoIP) profiles, geo location data, profile pictures, and the like that are associated with the applicant.

In one embodiment, the example page 300 is a part of a report or GUI regarding a CyberThreat Metric and digital profile for applicant(s) as determined by the applicant verification system. Generally, the provided report does not make a final determination on behalf of the users regarding an applicant. Instead, as described above, the application is assigned an assessment that includes validation data (e.g., output that may include a "Strong", "Medium"," or "Low" indication of a cybersecurity threat for the applicant) based on the determined CyberThreat Metric determined for the respective applicant. In some examples, these values are provided with a particular color (e.g., green, yellow, red) in the report. This color-coding system is intended to assist users in identifying potential areas of concern or discrepancies in the applicant information. However, it does not necessarily preclude the applicant from consideration or make a definitive judgment on their suitability for a position. The report empowers recruiters to make informed decisions based on comprehensive insights derived from the candidate's digital presence.

Example Process

Figure 4:
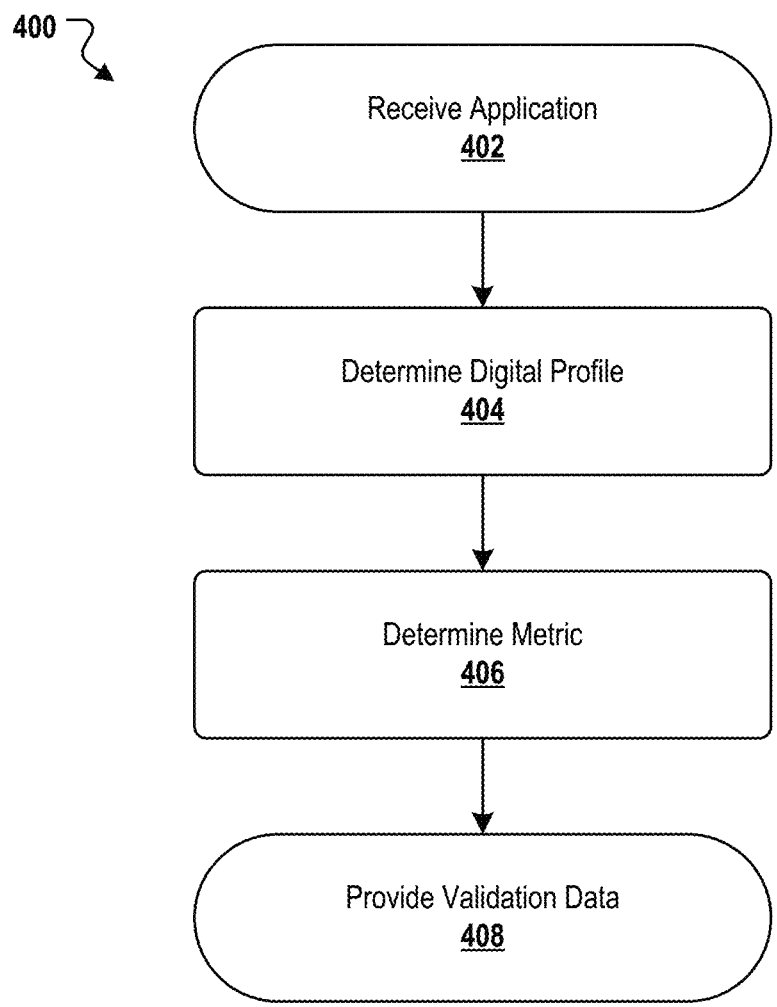
FIG. 4 depicts a flowchart of a non-limiting process for verifying an applicant.

FIG. 4 depicts a flowchart of an example process 400. The example process 400 can be implemented by the components of the example environment described above with respect to FIG. 2. The example process 400 generally shows in more detail how a CyberThreat Metric is determined for an applicant. Relevant output is provided to a user via the user interface 125 associated with the electronic device 202, 204, or 206.

For clarity of presentation, the description that follows generally describes the example process 400 in the context of FIGS. 1, 2, 3A, and 3B. However, it will be understood that the process 400 may be performed, for example, by any other suitable system, environment, software, and hardware, or a combination of systems, environments, software, and hardware as appropriate. In some implementations, various operations of the process 400 can be run in parallel, in combination, in loops, or in any order.

At 402, an application that includes an identifier associated with an applicant is received from a user device such as the electronic device 202, 204, or 206, via the user interface 125. In some implementations, the identifier includes an email address or a phone number. In some implementations, the identifier does not include a government-issued identification.

In some implementations, the plurality of attributes associated with the identifier includes a respective value for each of a plurality of online accounts. In some implementations, for at least an online account of the plurality of online accounts the identifier is provided to a registration application program interface associated with the online account, a response is received from the registration application program interface, and the response is used to set the respective value for the online account. In some implementations, the respective value for an online account representing whether or not the online account is associated with the identifier.

In some implementations, the plurality of attributes associated with the identifier include a date when each of the plurality of online accounts was created. In some implementations, the plurality of attributes associated with the identifier include an applicant name, a Caller Name Display, biographical information, headlines associated with the applicant, location details associated with the applicant, profile pictures, a number of connections or followers on at least one online account, whether or not the identifier is associated with a Voice over Internet Protocol service, or whether or not an identity of the applicant has been verified on at least one online account.

From 404, the process proceeds to 406 where the digital profile is processed through an assessment model to determine a metric (e.g., a CyberThreat Metric) for the applicant. In some implementations, the metric provides an indication of a likelihood that the applicant poses a cybersecurity threat.

In some implementations, the assessment model assigns a respective weight to each of the plurality of attributes. In some implementations, the metric is determined according to the respective weights. In some implementations, the assessment model is a machine-learning model trained using a dataset that includes a plurality of anonymized digital profiles. In some implementations, the assessment model is trained to continuously adapt an assessment algorithm based on the dataset. Thus, for example, the assessment model may be trained to objectively determine which attributes or combination of attributes are more likely to represent a higher risk.

In some implementations, a digital fingerprint associated with the user device is received (e.g., from the user device). In some implementations, the digital profile is determined for the applicant based on the identifier and the digital fingerprint. In some implementations, the metric for the applicant is determined based on a pattern identified based on the digital fingerprint. In some implementations, the pattern includes location data not aligning with a country code associated with the user device. In some implementations, the pattern is identified based on information previously collected from the user device or previously collected information associated with the applicant. In some implementations, the digital fingerprint includes network usage characteristics, internet protocol Geolocation data, SPAM blacklisting status, and internet service provider data.

From 406, the process proceeds to 408 where validation data for the application is provided to the user device based on the metric for the applicant. In some implementations, the validation data includes an indication of the metric (e.g., "Strong," "Medium," or "Low"). From 410, the process 400 ends or repeats. providing, to the user device, validation data for the application based on the metric for the applicant.

Non-Transitory Computer Readable Storage Medium

In some implementations, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some implementations, a computer readable storage medium includes, by way of non-limiting examples, compact disc read-only memories (CD-ROMs), digital versatile discs (DVDs), flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some implementations, the platforms, systems, media, and methods disclosed herein include at least one computer program, or use of the same. A computer program includes a sequence of instructions, executable in the electronic processor (e.g., CPU) of the computer, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some implementations, a computer program comprises one sequence of instructions. In some implementations, a computer program comprises a plurality of sequences of instructions. In some implementations, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Machine Learning

In some implementations, machine learning algorithms are employed to build a model to determine a CyberThreat Metric based on an applicant's digital profile. Examples of machine learning algorithms may include a support vector machine (SVM), a naïve Bayes classification, a random forest, a neural network, deep learning, or other supervised learning algorithm or unsupervised learning algorithm for classification and regression. The machine learning algorithms may be trained using one or more training datasets. For example, previously received digital profile data may be employed to train various algorithms. Moreover, as described above, these algorithms can be continuously trained/retrained using real-time user data as it is received. In some implementations, the machine learning algorithm employs regression modeling where relationships between variables are determined and weighted. In some implementations, the machine learning algorithm employs regression modeling where relationships between predictor variables and dependent variables are determined and weighted.

Web Application

In some implementations, a computer program includes a web application. A web application refers to an application software that runs on a web server, unlike computer-based software programs that are run locally on the operating system of the device. The web application is accessed by a user through a web browser with an active network connection. A part of the web application may run on a remote server and another part may run on a client device usually inside a web browser and both parts may communicate over a computer network, for example the internet. In some implementations, a web application is created using a software framework such as Microsoft® .NET or Ruby on Rails (RoR). In some implementations, a web application employs one or more database systems including, by way of non-limiting examples, relational, non-relational, object oriented, associative, and extensible Markup Language (XML) database systems. In further embodiments, suitable relational database systems include, by way of non-limiting examples, Microsoft® SQL Server, mySQL™, and Oracle®. A web application may be written in one or more markup languages, presentation definition languages, client-side scripting languages, server-side coding languages, database query languages, or combinations thereof.

Mobile Application

In some implementations, a computer program includes a mobile application provided to a mobile device. In some implementations, the mobile application is provided to a mobile device at the time it is manufactured. In other embodiments, the mobile application is provided to a mobile computer via the computer network described herein. A mobile application is created by techniques known to those of skill in the art using hardware, languages, and development environments known to the art. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Standalone Application

In some implementations, a computer program includes a standalone application, which is a program that is run as an independent computer process, not an add-on to an existing process, (e.g., not a plug-in). Standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some implementations, a computer program includes one or more executable compiled applications.

Software Modules

In some implementations, the systems and methods disclosed herein include software, server, or database modules. Software modules are created using machines, software, and languages. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some implementations, software modules are in one computer program or application. In other embodiments, software modules are in more than one computer program or application. In some implementations, software modules are hosted on one machine. In other embodiments, software modules are hosted on more than one machine. In further embodiments, software modules are hosted on cloud computing platforms. In some implementations, software modules are hosted on one or more machines in one location. In other embodiments, software modules are hosted on one or more machines in more than one location.

Data Stores

In some implementations, the platforms, systems, media, and methods disclosed herein include one or more data stores. Data stores include repositories for persistently storing and managing collections of data. Types of data stores repositories include, for example, databases and simpler store types, or use of the same. Simpler store types include files, emails, and so forth. In some implementations, a database is a series of bytes that is managed by a DBMS. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some implementations, a database is cloud computing based.

Other Definitions

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. When introducing elements of the present disclosure or the embodiment(s) thereof, the articles "a," "an," and "the" are intended to mean that there are one or more of the elements. Similarly, the adjective "another," when used to introduce an element, is intended to mean one or more elements. Any reference to "or" herein is intended to encompass "and/or" unless otherwise stated.

The terms "including" and "having" are intended to be inclusive such that there may be additional elements other than the listed elements. The term "exemplary" is not intended to be construed as a superlative example but merely one of many possible examples.

The term "approximately" as used herein refers to any values, including both integers and fractional components that are within a variation of up to ±10% of the value modified by the term "about." In certain aspects, the term "approximately" refers to a range of values that fall within 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). Alternatively, "approximately" can mean within 3 or more than 3 standard deviations, per the practice in the art.

It is understood that the foregoing detailed description and accompanying examples are merely illustrative and are not to be taken as limitations upon the scope of the invention.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added embodiments that are within the scope of the teachings herein. Adequacy of any particular element for practice of the teachings herein is to be judged from the perspective of a designer, manufacturer, seller, user, system operator or other similarly interested party, and such limitations are to be perceived according to the standards of the interested party.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein. No functional language used in claims appended herein is to be construed as invoking 35 U.S.C. § 112(f) interpretations as "means-plus-function" language unless specifically expressed as such by use of the words "means for" or "steps for" within the respective claim.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example embodiments does not define or constrain this disclosure. Other changes, substitutions, and alterations are also possible without departing from the spirit and scope of this disclosure.

What is claimed is:

1. A method comprising:
   receiving, from a user device, an application that includes an identifier associated with an applicant;
   determining, from at least one of a domain search, an email lookup, a phone lookup, a reverse image search, or an email breach database, a digital profile for the applicant based on the identifier, wherein the digital profile includes a plurality of attributes, the plurality of attributes including a respective value for each of a plurality of online accounts;
   processing the digital profile through an assessment model to determine a metric for the applicant; and
   providing, to the user device, validation data for the application based on the metric for the applicant.

2. The method of claim 1, wherein the assessment model assigns a respective weight to each of the plurality of attributes, and wherein the metric is determined according to the respective weights.

3. The method of claim 1, further comprising, for at least an online account of the plurality of online accounts:
   providing the identifier to a registration application program interface associated with the online account;
   receiving a response from the registration application program interface; and
   using the response to set the respective value for the online account.

4. The method of claim 1, wherein the respective value for an online account represents whether or not the online account is associated with the identifier.

5. The method of claim 1, wherein the plurality of attributes associated with the identifier include a date when each of the plurality of online accounts was created.

6. The method of claim 1, wherein the plurality of attributes associated with the identifier include an applicant name, a Caller Name Display, biographical information, headlines associated with the applicant, location details associated with the applicant, profile pictures, a number of connections or followers on at least one online account, whether or not the identifier is associated with a Voice over Internet Protocol service, or whether or not an identity of the applicant has been verified on at least one online account.

7. The method of claim 1, further comprising:
   receiving, from the user device, a digital fingerprint associated with the user device; and
   determining the digital profile for the applicant based on the identifier and the digital fingerprint,
   wherein the metric for the applicant is determined based on a pattern identified based on the digital fingerprint.

8. The method of claim 7, wherein the pattern includes location data not aligning with a country code associated with the user device.

9. The method of claim 7, wherein the pattern is identified based on information previously collected from the user device or previously collected information associated with the applicant.

10. The method of claim 7, wherein the digital fingerprint includes network usage characteristics, internet protocol Geolocation data, SPAM blacklisting status, and internet service provider data.

11. The method of claim 1, wherein the identifier includes an email address or a phone number and does not include a government-issued identification.

12. The method of claim 1, wherein the assessment model is a machine-learning model trained using a dataset that includes a plurality of anonymized digital profiles, and wherein the assessment model is trained to continuously adapt an assessment algorithm based on the dataset.

13. The method of claim 1, wherein the metric provides an indication of a likelihood that the applicant poses a cybersecurity threat.

14. A system for verifying an applicant, the system comprising:
a user device; and
an electronic processor configured to:
receive, from the user device, an application that includes an identifier associated with an applicant;
receive, from the user device, a digital fingerprint associated with the user device, the digital fingerprint including network usage characteristics, internet protocol geolocation data, SPAM blacklisting status, and internet service provider data;
determine a digital profile for the applicant based on the identifier and the digital fingerprint;
process the digital profile through an assessment model to determine a metric of the applicant based on a pattern identified based on the digital fingerprint; and
provide, to the user device, validation data for the application based on the metric for the applicant.

15. A non-transitory computer readable medium having stored thereon executable instructions that, when executed by an electronic processor, cause the electronic processor to perform operations comprising:
receiving, from a user device, an application that includes an identifier associated with an applicant;
determining, from at least one of a domain search, an email lookup, a phone lookup, a reverse image search, or an email breach database, a digital profile for the applicant based on the identifier, wherein the digital profile includes a plurality of attributes, the plurality of attributes including a respective value for each of a plurality of online accounts;
processing the digital profile through an assessment model to determine a metric for the applicant; and
providing, to the user device, validation data for the application based on the metric for the applicant.

16. The non-transitory computer readable medium of claim 15, wherein the assessment model assigns a respective weight to each of the plurality of attributes, and wherein the metric is determined according to the respective weights.

17. The system of claim 14, wherein the digital profile includes a plurality of attributes associated with the identifier determined from a plurality of sources.

18. The system of claim 17, wherein the digital profile is determined from at least one of a domain search, an email lookup, a phone lookup, a reverse image search, or an email breach database.

19. The system of claim 18, wherein the plurality of attributes associated with the identifier includes a respective value for each of a plurality of online accounts.

20. The non-transitory computer readable medium of claim 15, wherein the operations further comprise:
receiving, from the user device, a digital fingerprint associated with the user device; and
determining the digital profile for the applicant based on the identifier and the digital fingerprint,
wherein the metric for the applicant is determined based on a pattern identified based on the digital fingerprint.

* * * * *